United States Patent [19]
Barton et al.

[11] Patent Number: 5,758,339
[45] Date of Patent: May 26, 1998

[54] METHOD OF IDENTIFYING SHARED AND UNSHARED INFORMATION USING SYSTEM CHAPTERS, A SYSPLEX CHAPTER, A TABLE OF CONTENTS, AND A HEADER

[75] Inventors: Janet Ellen Barton, Fremont; Nelson Wayne Fincher; Gerard Maclean Dearing, both of San Jose, all of Calif.

[73] Assignee: International Business Machines Corporation, Armonk, N.Y.

[21] Appl. No.: 655,908

[22] Filed: May 31, 1996

[51] Int. Cl.$^6$ .................. G06F 13/00; G06F 15/163
[52] U.S. Cl. .................. 707/8; 707/9; 707/10; 707/201; 711/141; 711/148; 711/173; 395/200.41; 395/200.45
[58] Field of Search .................. 395/608, 609, 395/610, 200.03, 497.04, 457, 456, 480, 200.45, 200.41; 707/8, 9, 10, 201; 711/141, 148, 173

[56] References Cited

U.S. PATENT DOCUMENTS

| | | | |
|---|---|---|---|
| 5,339,405 | 8/1994 | Elko et al. | 395/595 |
| 5,388,266 | 2/1995 | Frey et al. | 395/700 |
| 5,390,328 | 2/1995 | Frey et al. | 395/650 |
| 5,392,397 | 2/1995 | Elko et al. | 395/200 |
| 5,416,921 | 5/1995 | Frey et al. | 395/182.09 |
| 5,493,668 | 2/1996 | Elko et al. | 395/457 |
| 5,537,574 | 7/1996 | Elko et al. | 395/468 |
| 5,544,345 | 8/1996 | Carpenter et al. | 395/477 |
| 5,546,579 | 8/1996 | Josten et al. | 395/600 |
| 5,564,040 | 10/1996 | Kubala | 711/173 |

*Primary Examiner*—Thomas G. Black
*Assistant Examiner*—Jean R. Homere
*Attorney, Agent, or Firm*—Merchant, Gould, Smith, Edell, Welter & Schmidt, P.A.

[57] ABSTRACT

The present invention discloses a method, apparatus, article of manufacture, and memory for providing data manipulation capabilities in a distributed processing complex comprised of multiple interconnected and coordinated computer systems. In accordance with the present invention, a data set is allocated in a data storage device coupled to the computer systems and the data set is logically subdivided into system chapters, a sysplex chapter, a table of contents, and a header. System data is stored in the system chapters. Shared data is stored in the sysplex chapter. Chapter location information that points to locations for the system chapters and the sysplex chapter is stored in the table of contents. Table of contents location information that points to a location of the table of contents is stored in the header.

27 Claims, 11 Drawing Sheets

METHOD OF IDENTIFYING SHARED AND UNSHARED INFORMATION USING SYSTEM CHAPTERS, A SYSPLEX CHAPTER, A TABLE OF CONTENTS, AND A HEADER

BACKGROUND OF THE INVENTION

1. Field of the Invention

This invention relates in general to sharing information between multiple computer systems, and in particular to manipulating sysplex and system information.

2. Description of Related Art

In a multiprocessor complex, or sysplex, certain information, such as lock information, needs to be stored so that it may be obtained and updated by a single system in the sysplex or by all systems in the sysplex. Because this information is accessed frequently, there is a need in the art for a method that manipulates information that is shared by systems and information that belongs to one system. Furthermore, there is a need for a method that minimizes the amount of serialization required to ensure the integrity of the information and minimizes the amount of I/O required to update and obtain the information. Moreover, the method must provide accurate system information even if an update fails. In the event of an I/O or system failure, the previous state of the information must still be recoverable. Furthermore, the method must minimize the growth of the data set even though it is being frequently updated.

SUMMARY OF THE INVENTION

To overcome the limitations in the prior art described above, and to overcome other limitations that will become apparent upon reading and understanding the present specification, the present invention discloses a method, apparatus, article of manufacture, and memory for providing data manipulation capabilities in a distributed processing complex comprised of multiple interconnected and coordinated computer systems.

In accordance with the present invention, a data set is allocated in a data storage device coupled to the computer systems and the data set is logically subdivided into system chapters, a sysplex chapter, a table of contents, and a header. System data is stored in the system chapters. Shared data is stored in the sysplex chapter. Chapter location information that points to locations for the system chapters and the sysplex chapter is stored in the table of contents. Table of contents location information that points to a location of the table of contents is stored in the header.

The chapters are updated through the use of a page buffer, page index, and a page table. The pages are read into the page buffer. A line is placed in the page to be written. Thereafter, any partially empty pages are consolidated as much as possible, and the pages are written.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
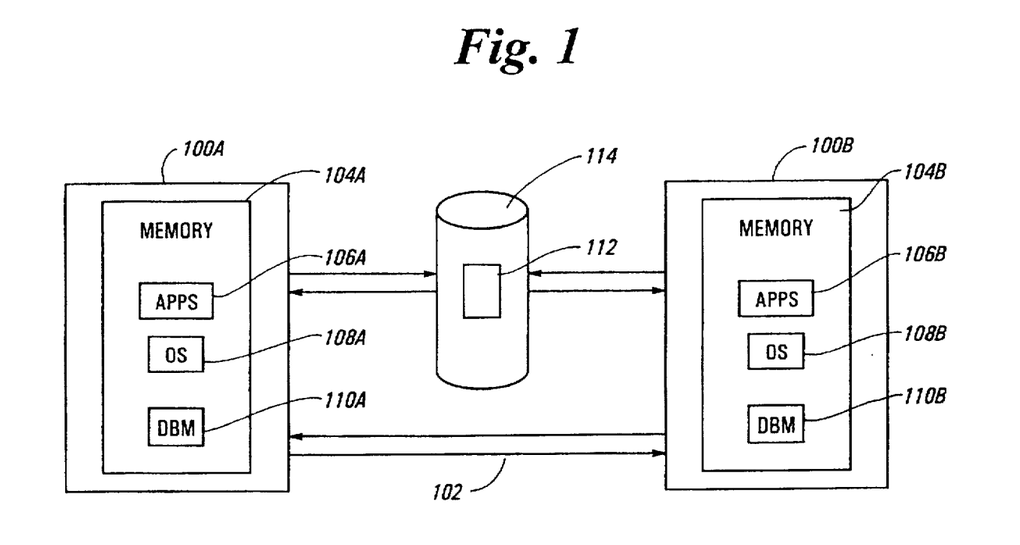
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, computer systems 100A and 100B communicate through communications link 102. The computer systems 100A and 100B may be comprised of system memories 104A and 104B, and each computer system 100A or 100B may be comprised of one or more processors. Those skilled in the art will recognize that, for example, the system memories 104A and 104B may be shared among all systems 100A and 100B in the sysplex or may exist independently in each system 100A or 100B. Under the control of the processors, multiple operating system (OS) images 108A and 108B execute applications (APPS) 106A and 106B. Under the control of the multiple operating system images 108A and 108B, applications 106A and 106B access shared and unshared data through data base managers (DBM) 110A and 110B. The data base managers 110A and 110B retrieve information requested by the applications 106A and 106B from a data base 112 stored on direct access storage device (DASD) 114. It will be apparent to those skilled in the art that, for example, the data base 112 may be temporarily stored in the memories 104A and 104B, or in other locations.

Generally, the applications 106A and 106B, the multiple operating system images 108A and 108B, and the data base managers 110A and 110B are all tangibly embodied in a computer-readable medium, such as the DASD 114. Moreover, applications 106A and 106B, the multiple operating system images 108A and 108B, and the data base managers 110A and 110B are all comprised of instructions which, when read and executed by the computer systems 100A and 100B, causes the computer systems 100A and 100B to perform the steps necessary to implement and/or use the present invention. Under control of the multiple operating system images 108A and 108B, the applications 106A and 106B and the data base managers 110A and 110B may be loaded from the DASD 114 into the system memories 104A and 104B for use during actual operations in implementing and/or performing the present invention.

Shared and Unshared Chapters

The present invention provides for a data set that contains information that is accessed by a single system 100A or 100B and that contains information that is shared between systems 100A and 100B. This data set can be accessed by each of the systems 100A and 100B and is structured in such a way that the most frequent operations on the data set are accomplished without serialization and with a minimum amount of I/O to the DASD 114.

Figure 2:
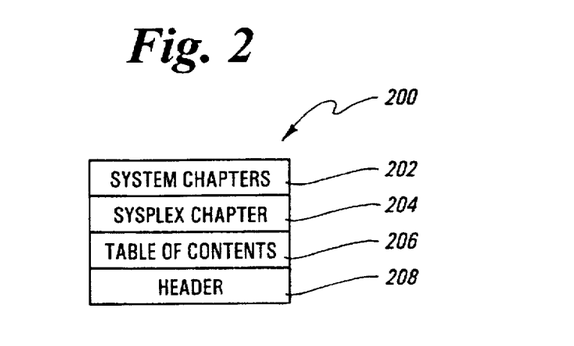
FIG. 2 is a block diagram illustrating the data set of this invention.

FIG. 2 illustrates the structure of the data set 200 as implemented in the present invention. The data set 200 is logically subdivided into four components: System Chapters 202, a Sysplex Chapter 204, a Table of Contents 206, and a Header 208.

The data set 200 resides in data base 112 on DASD 114 shared by all systems 100A and 100B in the sysplex. The data set 200 is divided into fixed sized pages. Groups of contiguous pages are known as pagesets. The System Chapters 202, the Sysplex Chapter 204, and the Table of Contents 206 each contain one or more pagesets. The Header 208 contains only one pageset.

The pages of the System Chapters 202 and the Sysplex Chapter 204 contain variable length Line Instances, which represent the information that a client adds to the System Chapters 202 or the Sysplex Chapter 204.

System Chapters 202 are 'owned' by a single system 100A or 100B. Sysplex Chapter 204 is shared by all systems 100A and 100B in a sysplex. The Table of Contents 206 points to where the System Chapters 202 and the Sysplex Chapter 204 are located. The Header 208 points to where the Table of Contents 206 is located.

The entire data set 200 is serialized across the sysplex for some infrequent operations. These operations include updates to the Table of Contents 206, such as adding chapters when a system checks out a chapter, deleting chapters when system information is no longer needed, extending the data set, and extending a chapter.

Updates to the Table of Contents 206 are accomplished by writing the Table of Contents 206 to a new pageset and updating the Header 208 pages. If a failure occurs before the Header 208 pages are updated, the old version is still available.

The Sysplex Chapter 204 that is shared by all systems 100A and 100B must also be serialized across systems 100A and 100B.

Once a System Chapter 202 is assigned to a system 100A or 100B, that system 100A or 100B may read or write to the System Chapter 202 without serializing the whole data set 200 across systems 100A and 100B. Only one system 100A or 100B reads or writes to the System Chapter 202, so System Chapter 202 accesses need only to be serialized within the system 100A or 100B.

Once the System Chapters 202, the Sysplex Chapter 204, and the data structures in memory have been initialized, they can be updated by using write I/Os only.

Figure 3:
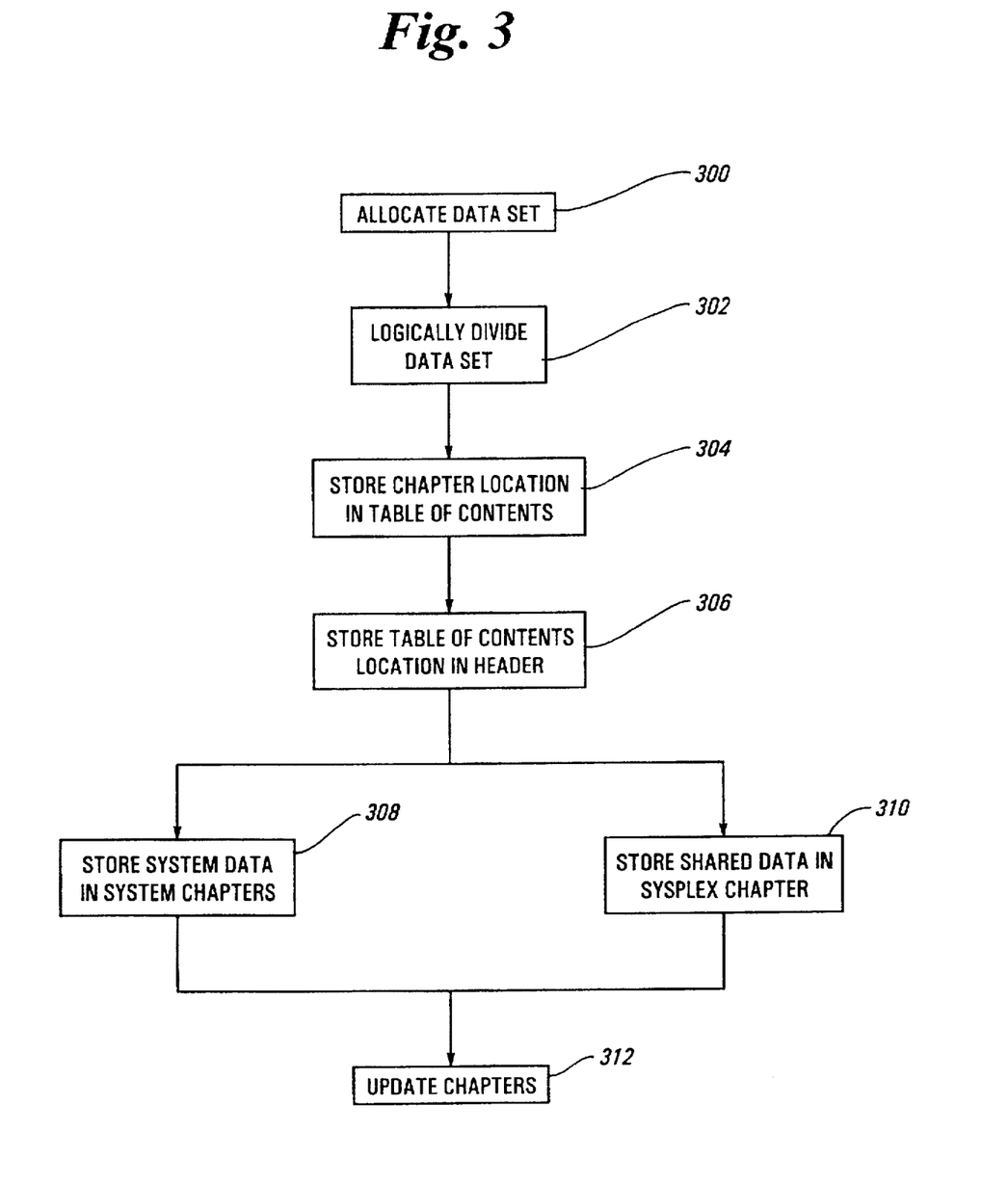
FIG. 3 is a flow chart illustrating the steps performed by the computer systems according to the present invention.

FIG. 3 is a flow chart illustrating the steps performed by the computer systems according to the present invention. Block 300 represents system 100A or 100B allocating a data set in a data storage device. Block 302 represents system 100A or 100B logically dividing the data into System Chapters 202, Sysplex Chapter 204, Table of Contents 206, and Header 208. Block 304 represents system 100A or 100B storing chapter location information in the Table of Contents 206 in the system memory 104A or 104B. Block 306 represents system 100A or 100B storing table of contents location information in Header 208 in the system memory 104A or 104B. Blocks 308 and 310 may be performed in parallel, wherein Block 308 represents system 100A or 100B storing system data in System Chapters 202 in the system memory 104A or 104B and Block 310 represents system 100A or 100B storing shared data in a Sysplex Chapter 204 in the system memory 104A or 104B. Block 312 represents system 100A or 100B updating the System Chapters 202, the Sysplex Chapter 204, the Table of Contents 206, and the Header 208 in the system memory 104A or 104B to reflect the new information.

Data Set Update

The System Chapters 202, the Sysplex Chapter 204, the Table of Contents 206, and the Header 208 are updated by using a method that provides enough information to recover to the previous state of information even if an I/O error occurs. This requirement means that each update must not write over current information, but write over a clean page or a page with obsolete information.

Chapter Update and Rebuild

Each chapter update is accomplished with a single page I/O, so if the I/O fails, only one page is corrupted. Because each update is done with a single page I/O, freespace consolidation is done as an on-going process. Otherwise, occasional free space consolidation would be needed. Each page contains a trailing 'FF' to detect if I/O has been interrupted.

Figure 4A:
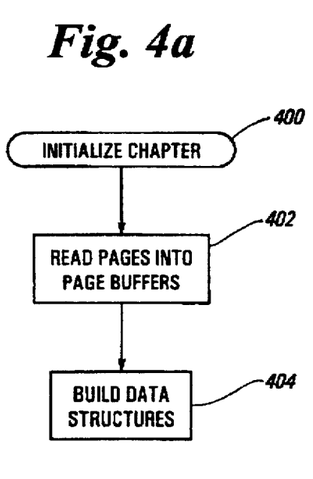
FIGS. 4a and 4b together are a flow chart illustrating the steps performed in the chapter update step of the present invention.
Figure 4B:
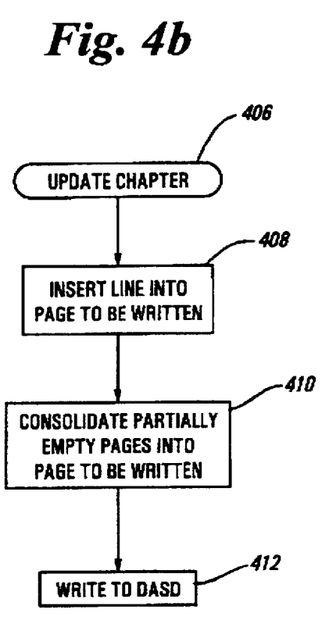

FIGS. 4a and 4b together are a flow chart illustrating the steps performed in the chapter updates of this invention. As part of System or Sysplex Chapter initialization, all read I/O operations are performed once, which allows the chapters to be updated by write I/O operations only. Referring first to FIG. 4a, Block 400 represents system 100A or 100B initializing the structures needed for updating a chapter. Block 402 represents system 100A or 100B reading the pages into page buffers into the memory 104A or 104B. Block 404 represents the building of the data structure stored in memory 104A or 104B, at which time the chapter is available for update. Sometime thereafter, the steps of FIG. 4b are performed. Referring next to FIG. 4b, Block 406 represents system 100A or 100B updating the chapters, which is also represented by Block 312 in FIG. 3. Block 408 represents system 100A or 100B inserting a line into a page to be written. Block 410 represents system 100A or 100B consolidating partially empty pages into the page to be written. Block 412 represents system 100A or 100B performing the I/O operation to DASD 114.

Figure 5:
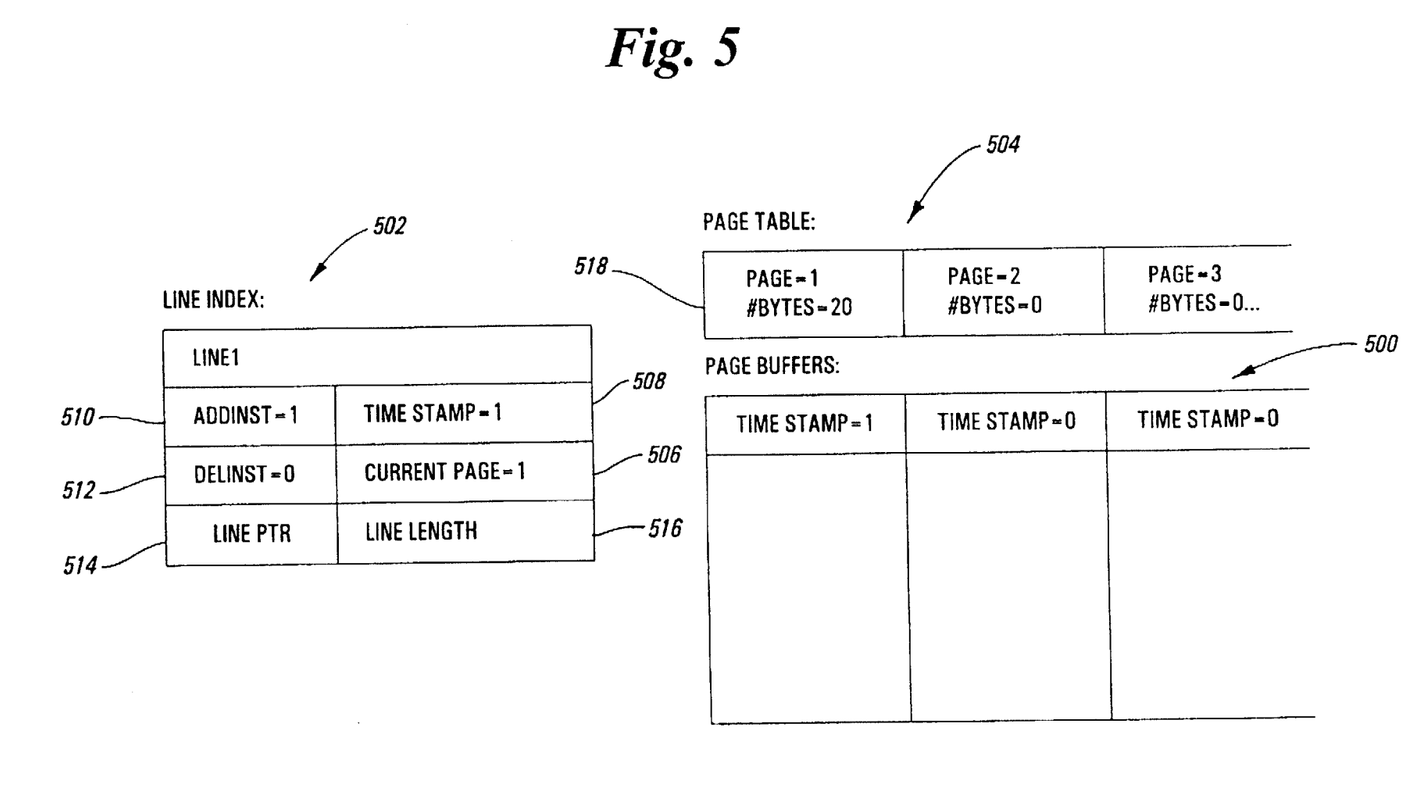
FIG. 5 is a block diagram illustrating the data structures in memory created to update the data set according to the present invention.

FIG. 5 is a block diagram illustrating the data structures stored in system memories 104A and 104B that are created to update the data set according to the present invention. The chapter, and corresponding pages, are read by the system 100A or 100B at start-up. At the time the pages are read, a page buffer 500, a line index 502, and a page table 504 are created in the system memories 104A and 104B to keep track of the lines instances in the pages.

The page buffer 500 stores copies of the pages for the I/O.

The line index 502 is created to keep track of each line instance. The line index 502 records the line instance's current page 506, timestamp 508, the number of add instances 510, the number of delete instances 512, location 514, and the line length 516. In an exemplary embodiment, the line index 502 is implemented through the use of a binary tree in which each node represents a line instance. The line index 502 is updated every time a line instance is added or deleted from a chapter, moved to another page, or cleared from a page.

The page table 504 keeps track of the number of bytes 518 that each page contains. The number of bytes 518 is the number of bytes used by current line instances. When the number of bytes 518 drops to zero, the page may be reused.

A line is represented in a chapter by a number of Add Instances, Add and Delete Instances, or Delete Instances. When a line is added to a chapter, an Add Instance is created. When a line is deleted from a chapter, a Delete Instance is created. This Delete Instance then becomes the most current version of the line and logically removes it from the data set. A line is physically deleted from the data set only when all Add and Delete Instances have been written over. There may be many copies of line instances because the most current instance is copied for space consolidation. The line index 502 keeps track of the most current Line Instance.

The method described herein helps keep pages full and keeps the data set relatively unfragmented.

Adding and deleting lines from the chapter may be batched. Multiple requests to add and delete lines may be placed on the free page. This reduces the number of I/Os needed to record information.

At any time, the pages in the chapter will describe the data that they are storing. Because of this, the structures in storage, page buffers 500, line index 502, and page table 504, can be rebuilt from the line instances in a chapter.

In order to rebuild the line index 502 and page table 504, the pages are read in to the system 100A or 100B. Each page contains a timestamp to help locate the most current Line Instances. Each Line Instance on each page is read in and the line index 502 is updated. If the Line Instance is more current than the previous Line Instances read in, then the more current Line Instance is used. In any case, the number of Add or Delete Instances is incremented.

If a page shows that it was not completely updated, e.g., the trailing 'FF' is not written, then that page may be ignored. The trailing 'FF' indicates that the I/O did not complete so the caller was never notified that the line was added or deleted. The state of the data is correct if the incomplete page is ignored.

Example of Chapter Updates

FIGS. 6a–6g are a sequence of block diagrams illustrating an example of the chapter updates of this invention. Although a particular type of data structure is used in the preferred embodiment of the present invention, those skilled in the art will recognize that the invention could be implemented with other methods and data structures, such as linked lists, etc.

Figure 6A:
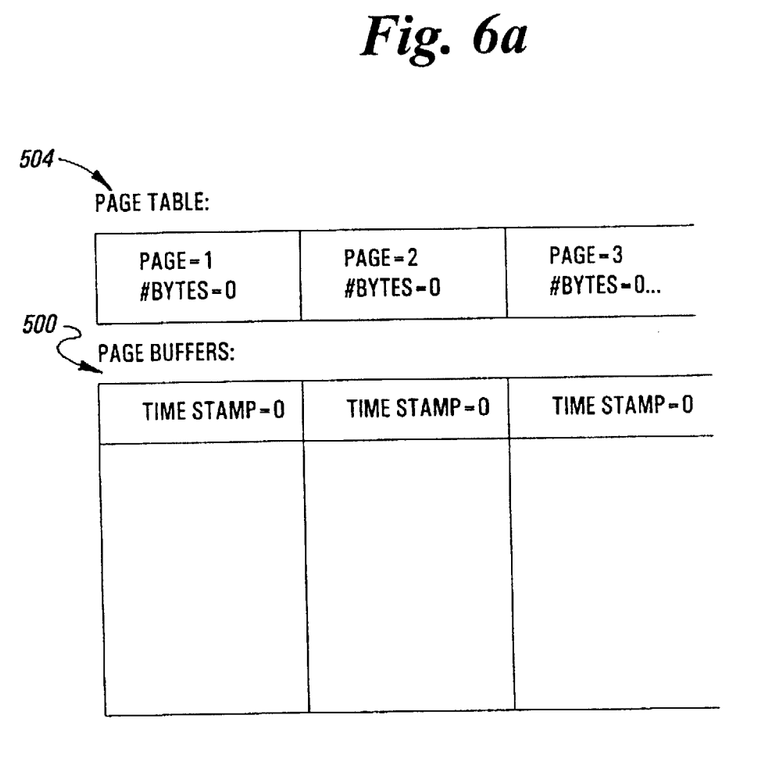
FIGS. 6a–6g are a sequence of block diagrams illustrating an example of the chapter updates of this invention.

FIG. 6a represents the initialized page buffers 500 and page table 504. The open-ended right side of page buffers 500 and page table 504 indicate that the number of page buffers 500 and page table 504 are variable. Initially, there is no information in the chapter and there are no entries in the line index 502. The page buffer 500 and the page table 504 are empty.

Figure 6B:
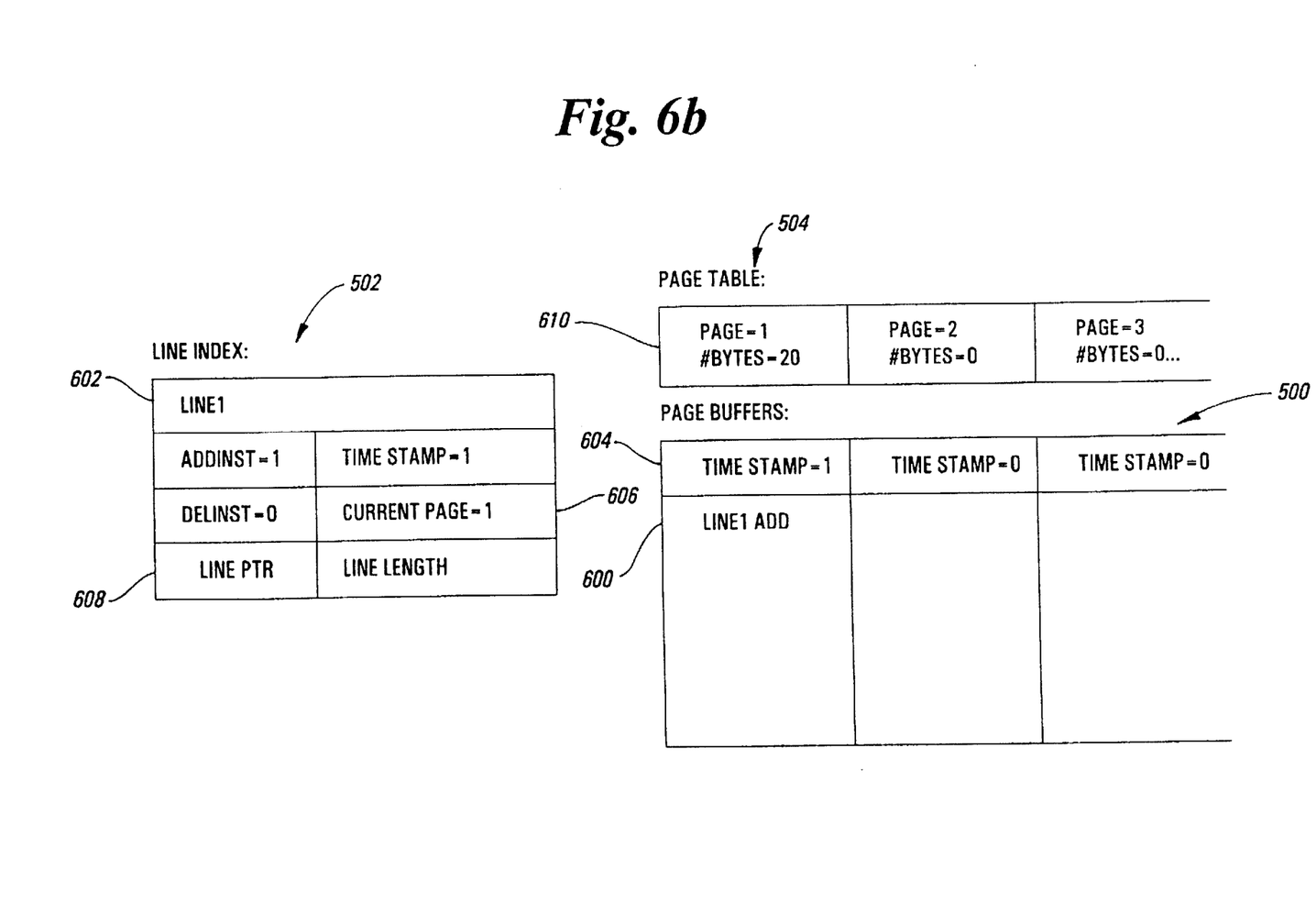

FIG. 6b represents adding a first line to a chapter. An Add Instance 600 for Line1 is placed on empty page 1. A node 602 in the line index 502 is created for Line1. For this example, only the first node in the line index 502 will show how the actual node information is updated. There is now one Add Instance 600 for Line1, and no Delete Instances. The timestamp 604 is 1 and the current page 606 is page 1. The line pointer 608 points to the location in storage of the page. Page 1 is written to DASD 114. Line 1 has a length of 20 so the number of bytes 610 on page 1 is incremented to 20.

Figure 6C:
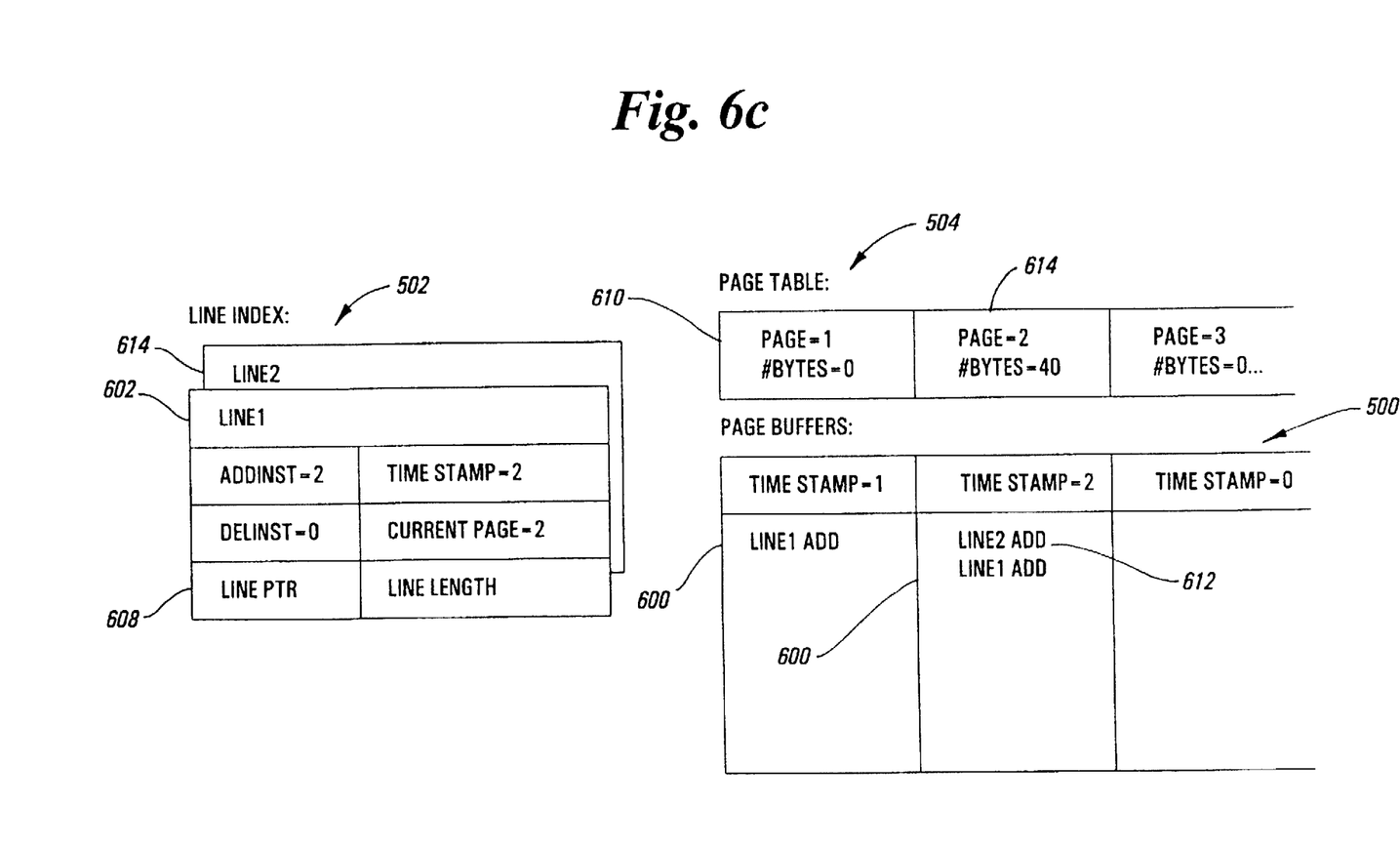

FIG. 6c represents adding a second line to the chapter. An Add Instance for the second line 612 is added to empty page 2. A node 614 in the line index 502 is created for Line2. Line2 node 614 is updated in the same way that Line1 node 602 was updated. Its line pointer points to the location in storage of the page. Add Instance Line1 600 is copied to page 2 and its line pointer 608 now points to its new location on page 2. The number of bytes 615 used on page 2 is now 40 and the number of bytes 610 on page 1 is now 0. This consolidates the used space, frees page 1 to be used next time, and preserves the previous state of information. Page 2 is written to DASD 114.

Figure 6D:
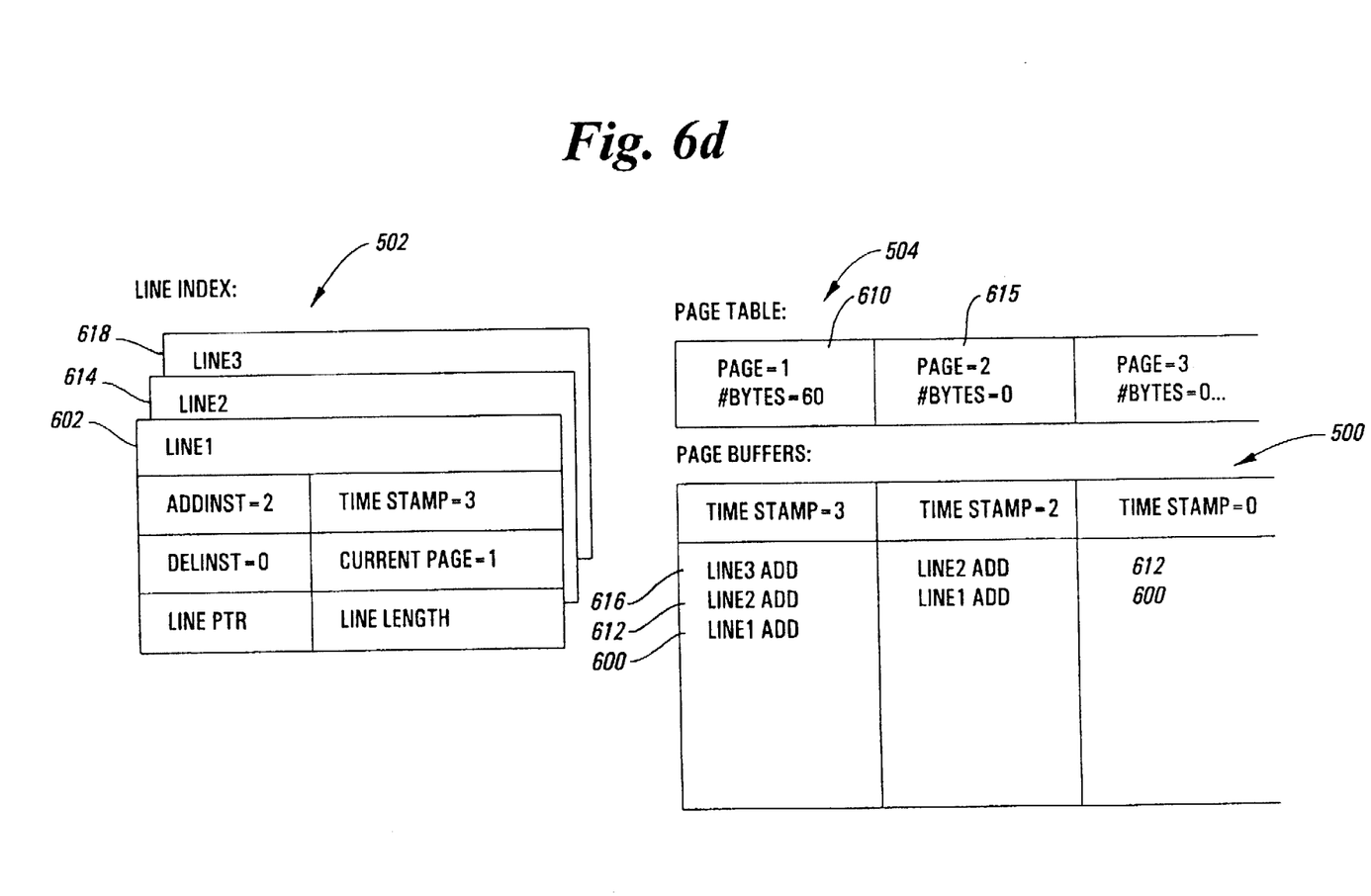

FIG. 6d represents adding a third line to the chapter. Page 1 is selected for next page and is cleared. An Add Instance for the third line 616 is added to now free page 1. A node 618 in line index 502 is created for Line3. Add Instance Line2 612 and Add Instance Line1 600 are copied to page 1 and their line nodes 614 and 602 are updated with their new location. The number of bytes 610 used on page 1 is now 60 and the number of bytes 615 used on page 2 is now 0. Page 1 is written to DASD 114.

Figure 6E:
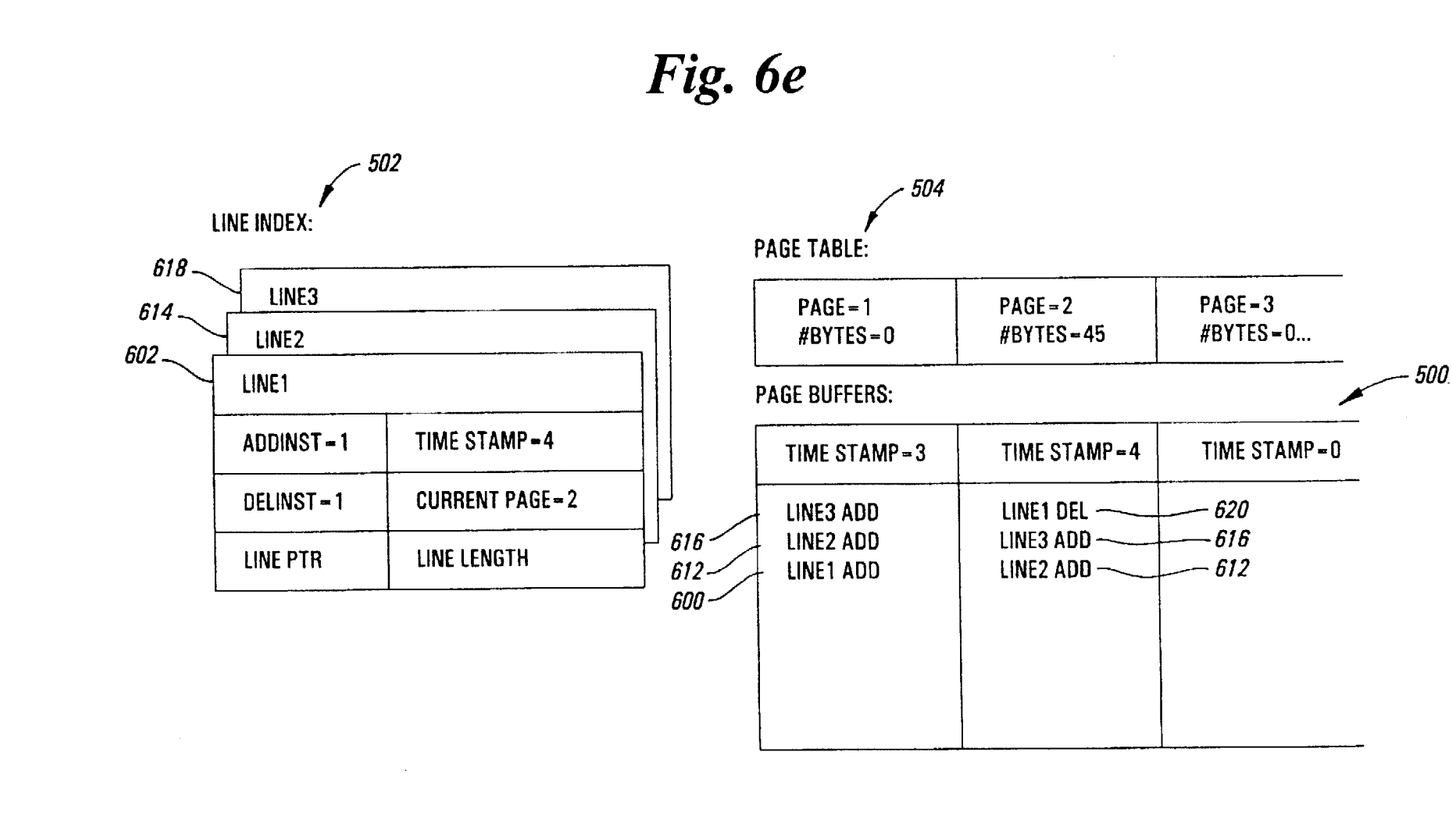

FIG. 6e represents deleting the first line from the chapter. Page 2 is selected for next page and is cleared. A Line1 Delete Instance 620 is created and added to page 2. The Delete Instance 620 has a length of 5. Add Instance Line3 616 and Add Instance Line2 612 are copied to page 2, but Add Instance Line1 600 is not. Page 2 is written to DASD 114. Line1 is logically deleted by the Line1 Delete Instance. At this point, if a system failure were to occur, the line index 502 could be rebuilt from the pages using the timestamp to determine the most current Line Instance. The Line1 Delete Instance 620 must not be deleted until all Line1 Add Instances are deleted.

Figure 6F:
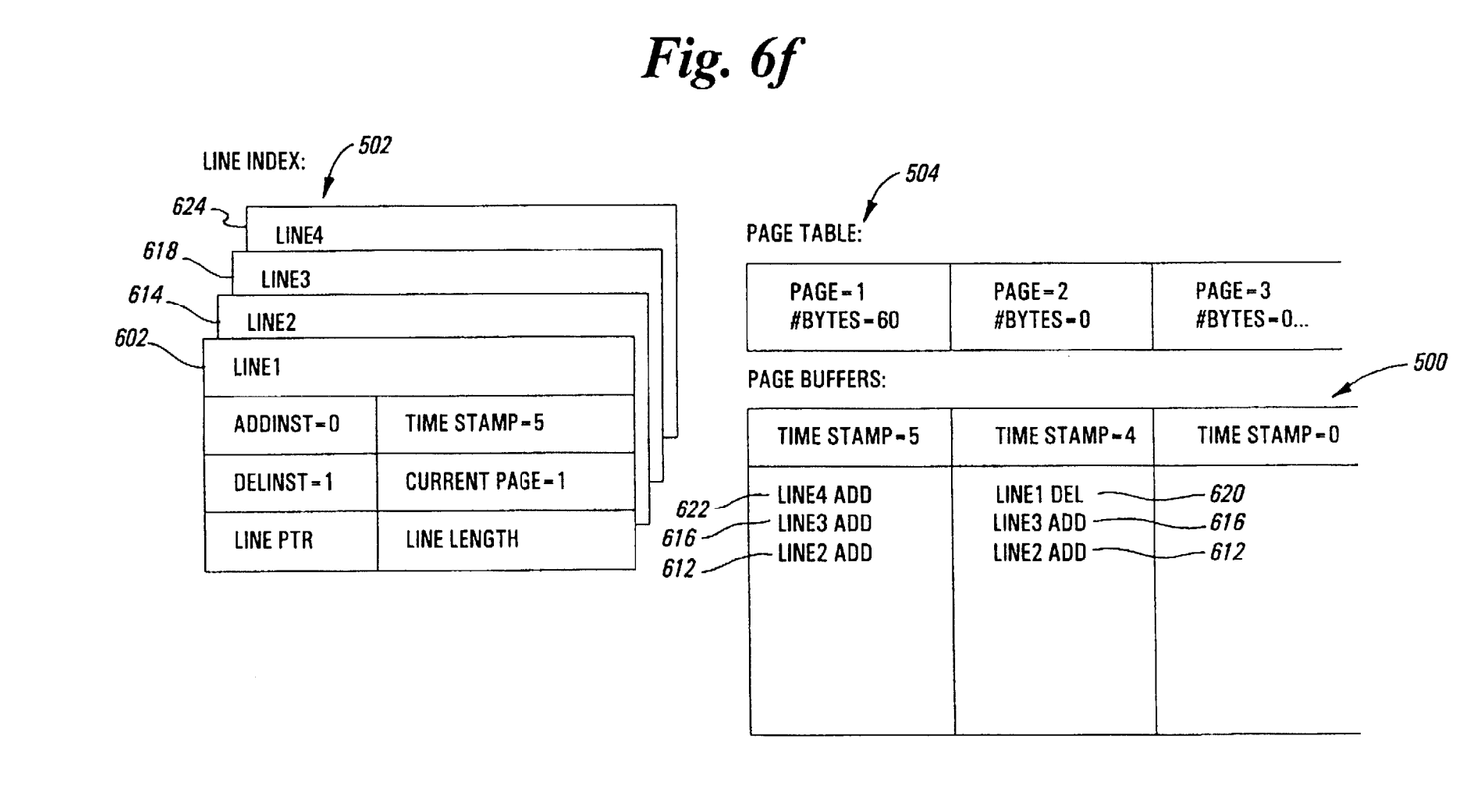

FIG. 6f represents adding a fourth line to the chapter. Page 1 is selected for next page and is cleared. An Add Instance for the fourth line 622 is added to the page. A node 624 in line index 502 is created for the fourth line 622. Add Instance Line3 616 and Add Instance Line2 612 are copied over to page 1 and their nodes 618 and 614 are updated. Page 1 is then written to DASD 114. This is how the Line1 Add Instance 600 is deleted. Now, only the Line1 Delete Instance 620 exists. The Line1 Delete Instance 620 no longer needs to be kept around.

Figure 6G:
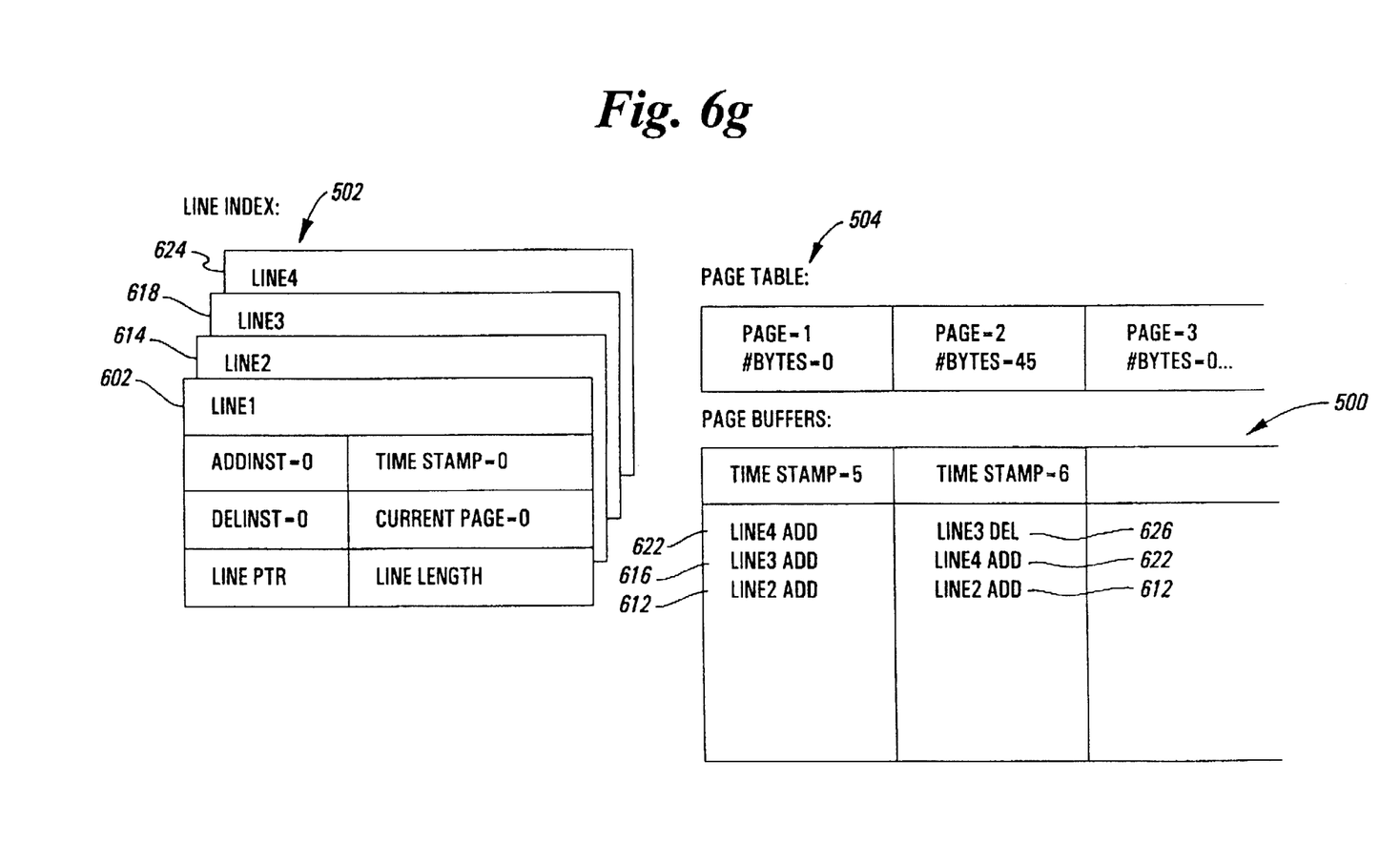

FIG. 6g represents deleting the third line from the chapter. Page 2 is cleared and a Delete Instance 626 is created for Line3 and is placed on page 2. Add Instance Line4 622 and Add Instance Line2 612 are copied over and their line nodes 624 and 614 are updated. Page 2 is written to DASD 114. The Line1 Delete Instance 620 is now written over, so Line1 no longer has any line instances representing it in the data set.

CONCLUSION

This concludes the description of the preferred embodiment of the invention.

In summary, the present invention discloses a method, apparatus, article of manufacture, and memory for providing data manipulation capabilities in a distributed processing complex comprised of multiple interconnected and coordinated computer systems. In accordance with the present invention, a data set is allocated in a data storage device coupled to the computer systems and the data set is logically subdivided into system chapters, a sysplex chapter, a table of contents, and a header. System data is stored in the system chapters. Shared data is stored in the sysplex chapter. Chapter location information that points to locations for the system chapters and the sysplex chapter is stored in the table of contents. Table of contents location information that points to a location of the table of contents is stored in the header.

The chapters are updated through the use of a page buffer, page index, and a page table. The pages are read into the page buffer. A line is placed in the page to be written. Thereafter, any partially empty pages are consolidated as much as possible and the pages are written.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for manipulating data in a data set in a distributed processing complex comprised of multiple interconnected and coordinated computer systems, the method comprising the steps of:

(a) allocating a data set in a data storage device coupled to the computer systems;

(b) logically subdividing the data set into system chapters, a sysplex chapter, a table of contents, and a header;

(c) storing system data in the system chapters, wherein the system chapters comprise data used by one of the systems in the distributed processing complex;

(d) storing shared data in a sysplex chapter, wherein the sysplex chapter comprises data shared by all of the systems in the distributed processing complex;

(e) storing chapter location information in the table of contents, wherein the table of contents points to locations for the system chapters and the sysplex chapter; and (f) storing table of contents location information in the header, wherein the header points to a location of the table of contents.

2. The method of claim 1, further comprising the step of serializing the system chapter across the system.

3. The method of claim 1, further comprising the step of serializing the sysplex chapter across the distributed processing complex so that only one system can update the sysplex chapter at a time.

4. The method of claim 1, further comprising the step of serializing the table of contents across the distributed processing complex so that only one system can update the table of contents at a time.

5. The method of claim 1, further comprising the step of serializing the header across the distributing processing complex so that only one system can update the header at a time.

6. The method of claim 1, further comprising the step of updating the chapters.

7. The method of claim 1, wherein the system chapters and the sysplex chapter are each comprised of one or more pages, and each of the pages contains zero or more line instances, and each of the line instances represents information added to the system chapters and the sysplex chapter.

8. The method of claim 7, wherein the page comprises a size, the method further comprising the step of using a page table to monitor the page's size.

9. The method of claim 7, wherein the line comprises a location, the method further comprising the step of using a line index to monitor the line's location.

10. The method of claim 7, wherein each of the line instances is associated with a line index storing one or more values from a group comprising: the line instance's current page, the line instance's timestamp, a count of add instances, a count of delete instances, a location of the line instance, and a length of the instance.

11. The method of claim 10, wherein the line index is implemented by a binary tree in which each node represents a line instance.

12. The method of claim 10, wherein the line index is updated every time a line instance is added or deleted from a chapter, moved to another page, or cleared from a page.

13. An apparatus for manipulating data in a data set in a distributed processing complex comprised of multiple interconnected and coordinated computer systems, comprising:

(a) a computer having a memory;

(b) means, performed by the computer, for allocating a data set in a data storage device coupled to the computer systems;

(c) means, performed by the computer, for logically subdividing the data set into system chapters, a sysplex chapter, a table of contents, and a header;

(d) means, performed by the computer, for storing system data in the system chapters, wherein the system chapters comprise data used by one of the systems in the distributed processing complex;

(e) means, performed by the computer, for storing shared data in a sysplex chapter, wherein the sysplex chapter comprises data shared by all of the systems in the distributed processing complex;

(f) means, performed by the computer, for storing chapter location information in the table of contents, wherein the table of contents points to locations for the system chapters and the sysplex chapter; and (g) means, performed by the computer, for storing table of contents location information in the header, wherein the header points to a location of the table of contents.

14. The apparatus of claim 13, further comprising means for serializing the system chapter across the system.

15. The apparatus of claim 13, further comprising means for serializing the sysplex chapter across the distributed processing complex so that only one system can update the sysplex chapter at a time.

16. The apparatus of claim 13, further comprising means for serializing the table of contents across the distributed processing complex so that only one system can update the table of contents at a time.

17. The apparatus of claim 13, further comprising means for serializing the header across the distributing processing complex so that only one system can update the header at a time.

18. A program storage device, readable by a computer having a memory and coupled to a data storage device, tangibly embodying one or more programs of instructions executable by the computer to perform method steps for manipulating data in a data set in a distributed processing complex comprised of multiple interconnected and coordinated computer systems, the method comprising the steps of:

(a) allocating a data set in the data storage device coupled to the computer systems;

(b) logically subdividing the data set into system chapters, a sysplex chapter, a table of contents, and a header;

(c) storing system data in the system chapters, wherein the system chapters comprise data used by one of the systems in the distributed processing complex;

(d) storing shared data in a sysplex chapter, wherein the sysplex chapter comprises data shared by all of the systems in the distributed processing complex;

(e) storing chapter location information in the table of contents, wherein the table of contents points to locations for the system chapters and the sysplex chapter; and (f) storing table of contents location information in the header, wherein the header points to a location of the table of contents.

19. The program storage device of claim 18, further comprising the step of serializing the system chapter across the system.

20. The program storage device of claim 18, further comprising the step of serializing the sysplex chapter across the distributed processing complex so that only one system can update the sysplex chapter at a time.

21. The program storage device of claim 18, further comprising the step of serializing the table of contents across the distributed processing complex so that only one system can update the table of contents at a time.

22. The program storage device of claim 18, further comprising the step of serializing the header across the distributing processing complex so that only one system can update the header at a time.

23. A memory for storing data for manipulating data in a distributed processing complex comprised of multiple interconnected and coordinated computer systems, comprising:
   a data structure stored in a memory of the computer systems, the data structure including:
      system chapters, wherein the system chapters store system data used by one of the systems in the distributed processing complex;
      a sysplex chapter, wherein the sysplex chapter stores data shared by all systems in the distributed processing complex;
      a table of contents, wherein the table of contents stores pointers for locating the system chapters and the sysplex chapter; and
      a header, wherein the header stores a pointer for locating the table of contents.

24. The memory of claim 23, wherein the system chapter is serialized across the system.

25. The memory of claim 23, wherein the sysplex chapter is serialized across the distributed processing complex so that only one system can update the sysplex chapter at a time.

26. The memory of claim 23, wherein the table of contents is serialized across the distributed processing complex so that only one system can update the table of contents at a time.

27. The memory of claim 23, wherein the header is serialized across the distributing processing complex so that only one system can update the header at a time.

* * * * *

UNITED STATES PATENT AND TRADEMARK OFFICE
CERTIFICATE OF CORRECTION

PATENT NO. : 5,758,339
DATED : May 26, 1998
INVENTOR(S) : Barton et al.

Page 1 of 1

It is certified that error appears in the above-identified patent and that said Letters Patent is hereby corrected as shown below:

Title page,
Please add in section:
-- [56] References Cited
U.S. PATENT DOCUMENTS

| | | | |
|---|---|---|---|
| 5,161,227 | 11/03/92 | Dias et al. | 395/650 |
| 5,339,427 | 08/16/94 | Elko | 395/725 |
| 5,410,695 | 04/25/95 | Frey et al. | 395/650 |
| 5,305,448 | 04/19/94 | Insalaco et al. | 395/425 |
| 5,463,754 | 10/31/95 | Beausoleil et al | 395/200.08 |

OTHER DOCUMENTS
B. McNutt, "Background Data Movement in a Log-structured Disk Subsystem," IBM J. Res. Develop., Vol. 38, No. 1, January 1994 --

Signed and Sealed this

Twenty-first Day of May, 2002

Attest:

Attesting Officer

JAMES E. ROGAN
Director of the United States Patent and Trademark Office